United States Patent [19]
Calvignac et al.

[11] Patent Number: 5,946,297
[45] Date of Patent: Aug. 31, 1999

[54] SCHEDULING METHOD AND APPARATUS FOR SUPPORTING ATM CONNECTIONS HAVING A GUARANTEED MINIMUN BANDWIDTH

[75] Inventors: Jean Calvignac, Cortlandt Manor, N.Y.; Daniel Orsatti, Cagnes sur Mer; Fabrice Verplanken, La Gaude, both of France

[73] Assignee: International Business Machines Corporation, Armonk, N.Y.

[21] Appl. No.: 08/786,914

[22] Filed: Jan. 22, 1997

[51] Int. Cl.$^6$ .................................................. H04L 12/56
[52] U.S. Cl. ........................... 370/230; 370/462; 370/468
[58] Field of Search .................................. 370/230, 235, 370/352, 395, 412, 415, 417, 429, 443, 444, 462, 232, 468

[56] References Cited

U.S. PATENT DOCUMENTS

| | | | |
|---|---|---|---|
| 5,638,371 | 6/1997 | Raychaudhuri et al. | 370/395 |
| 5,748,629 | 5/1998 | Caldara et al. | 370/389 |
| 5,754,529 | 5/1998 | Heiss | 370/232 |
| 5,793,747 | 8/1998 | Kline | 370/230 |

*Primary Examiner*—Min Jung
*Attorney, Agent, or Firm*—Daniel E. McConnell

[57] ABSTRACT

The method and apparatus of the present invention solve the problem of scheduling the transmission of cells in packet switched networks having network connections requiring a minimum bandwidth at connection establishment. The method and the apparatus further support any mixed traffic flow including connections requiring a minimum bandwidth, a fixed reserved bandwidth or no bandwidth at connection establishment. Scheduling is controlled by a dual scheduling mechanism having a first scheduler, triggered by absolute time, for scheduling the minimum service connections up to a rate corresponding to their reserved minimum bandwidth, a second scheduler and a queue of minimum service connection identifiers for communication between the two scheduling schemes. With the dual scheduling mechanism of the present invention, the minimum bandwidth for connections reserving a minimum bandwidth at connection establishment is guaranteed in each point of the connection path and at any time, with the level of fairness of the scheduling of the remaining bandwidth depending on the quality of the second scheduler.

14 Claims, 8 Drawing Sheets

SCHEDULING METHOD AND APPARATUS FOR SUPPORTING ATM CONNECTIONS HAVING A GUARANTEED MINIMUN BANDWIDTH

FIELD OF THE INVENTION

This invention relates in general to a networking communication system and more particularly to ATM network nodes supporting a service guaranteeing a minimum bandwidth to the user connection.

BACKGROUND OF THE INVENTION

Asynchronous Transfer Mode (ATM) is to become the base technology for the next generation of high speed networks. High speed networks support a great diversity of applications with different traffic and Quality Of Service (QoS) requirements. Such diversity require different control flow strategies. For example, certain applications like multimedia and time critical data applications require guaranteed levels of delay and throughput but can tolerate losses, while others like LAN traffic can tolerate variations in delay and throughput but are very loss sensitive.

In the ATM Reserved Bandwidth (RB) service, a user needs to establish a traffic contract with the network at call set-up before transmitting data. The contract includes specification of a desired QoS class and a set of traffic descriptors. The network, through resource allocation, provides the desired QoS for the ATM connection or refuses the call. The allocated bandwidth between a source and a destination may be less than the peak rate in order to benefit from statistical multiplexing gains, but it requires complex software and may cause traffic congestion and data losses.

In a LAN environment, sources are bursty and unpredictable. Traffic has an extremely high variability on time scales ranging over several orders of magnitude. For such unpredictable sources, the peak rate could be allocated in order to avoid heavy losses inside the network. However, the network would be inefficiently used, since bandwidth would be reserved even during idle periods. One way to increase link utilization for the network is through the addition of a Non Reserved Bandwidth (NRB) service class. In this service class, no bandwidth at all is reserved and the sources can transmit on a best effort basis, grabbing as much bandwidth among the remaining bandwidth as they can, without affecting the RB traffic. Thus, no resources being allocated in advance, the NRB service requires a control flow scheme in order to control the sources. The quality of the flow control mechanism qualifies the efficiency of the NRB service support in terms of cell loss ratio. The hop-by-hop congestion flow control mechanism disclosed in the European patent application EP94480125 implemented in the network nodes on the connections path is an improved flow control mechanism. With the selective (per connection) or global backpressure commands sent from an adjacent node, the entering traffic is selectively or globally resumed or throttled in each hop of the connection path.

However, NRB connections have no guarantee at all to be served by the ATM network, as discussed in the ATM Forum Technical committee in the traffic management working group, a need for a new service category is identified with the Available Bit Rate (ABR) service situated between the reserved and non reserved bandwidth services. For an ABR connection, the end-system shall specify to the network both a maximum required bandwidth (Peak Cell Rate, PCR) and a minimum required bandwidth (Minimum Cell Rate, MCR). The ABR service as defined at the ATM Forum includes also a flow control protocol between the source and the destination. The end-system is supposed to adapt its traffic in accordance with the feedback received from the flow control mechanism. The characteristics expected from ABR service are: guaranteed minimum bandwidth, a fair share of the available bandwidth and, with the flow control protocol, a low cell gloss ratio. As this service cannot control cell transfer delay, it is not intended to support real time applications. It applies to the same applications as NRB service particularly when the end-system requires a guaranteed QoS: critical data transfer (such as Defense information), super computer applications and any data telecommunication (as for NRB service : email, telex, fax, banking transactions, LAN interconnection etc . . . ) requiring better delay behavior (such as distributed file transfer, remote procedure call, computer process swap/paging).

While the cell loss ratio of the ABR service will depend on the quality of the flow control, the characteristics expected for the ABR service as for the guaranteed minimum bandwidth per connection and sharing fairly the available bandwidth, depend on the quality of the scheduling scheme. In the ATM network nodes of the industry, with this emerging ABR service, there is a need for providing a scheduling scheme able to support connections having a minimum bandwidth guaranteed and a fair share of the available bandwidth. This so called hereunder 'Minimum Service' support, guarantees to each connection for which a minimum bandwidth has been required and accepted at connection set-up (MCR), to have this minimum bandwidth. Depending on the quality of the scheduling scheme implemented in the network nodes of the connection paths, the minimum bandwidth can be guaranteed either globally on the path or at any time and in each node of the network nodes. Both ways of guaranteeing a minimum bandwidth are compliant with the MCR parameter. The second characteristic of Minimum Service support is a fair sharing of the 'remaining' bandwidth; this later comprises the bandwidth not reserved for the minimum service traffic and the part of the bandwidth reserved but not used by the minimum service traffic. In fact, if the scheduling scheme for support of Minimum Service can be combined with a network flow control mechanism such as the ABR flow control, the resulting support would improve the cell loss ratio; i.e., the more the network flow control the lower the cell loss ratio.

It is a first object of the invention to provide a scheduling scheme for support of Minimum Service connections such as ABR connections, guaranteeing the minimum usable bandwidth to each connection and a fair share of the remaining bandwidth between these connections.

It is a second object of the invention that the minimum bandwidth of each Minimum Service connection, if requested, is actually provided independently of the respective incoming rates of the other connections supported in the node. More particularly, the minimum bandwidth allocated to each Minimum Service connection is guaranteed even if the aggregate incoming traffic exceeds the output capacity.

It is a third object of the invention to support any mixed traffic comprising RB (CBR, VBR for the ATM Forum) or NRB (UBR for the ATM Forum) or Minimum Service connections such as the ABR connections defined at the ATM Forum, while maintaining the same characteristics or QoS expected for each type of service as if they where served alone; particularly, maintaining a low CLR for ABR service.

SUMMARY OF THE INVENTION

The invention discloses a method for receiving and transmitting in a packet network node the packets of connections having a minimum of bandwidth required at connection establishment; said method comprising the steps of:

receiving a packet in a dedicated connection queue;

scheduling, under the control of absolute time, the connection queues according to the rate corresponding to their reserved bandwidths;

storing queue identifiers of the scheduled connection queues;

reading the stored connection queue identifiers, and if any identifier is found, transmitting the first packet, if any packet is found, of the connection queue corresponding to the identifier read;

if no identifier is stored, scheduling the connection queues and transmitting the first packet, f any packet is found, of the scheduled queues.

More particularly, the method of the invention can be used for ATM networks where the packets are ATM cells.

The invention discloses also an apparatus implementing the steps of the method which can be used in the adapters of the network node.

With the solution of the present invention, dual scheduling is established; the first scheduling guarantees up to the minimum bandwidth when required by a Minimum Service connection; the complementary scheduling shares the remaining bandwidth among the connections with no impact on the scheduling of the minimum bandwidth. Furthermore, the first scheduling can handle the RB traffic with the QoS required by the ATM Forum; in parallel, the complementary scheduling can handle NRB traffic as well, with fairness sharing of the bandwidth among NRB and Minimum Service connections when the scheduler is a Round Robin scheduler; combined with the ABR feedback mechanism, the scheduling scheme of the present invention supports the ABR service of the ATM Forum. The complementary scheduler can be submitted to the commands of a network control flow such as the hop-by-hop mechanism of the prior art, bringing a loss free service for NRB and Minimum Service support.

With the scheduling of the present invention, the minimum bandwidth is respected in each node point of the connection path and at any time. With respect to the minimum bandwidth required at connection establishment by a minimum service connection, the minimum bandwidth is provided in a 'deterministic' and not a 'statistical' manner in the network.

DETAILED DESCRIPTION OF THE PREFERRED EMBODIMENT

Figure 1:
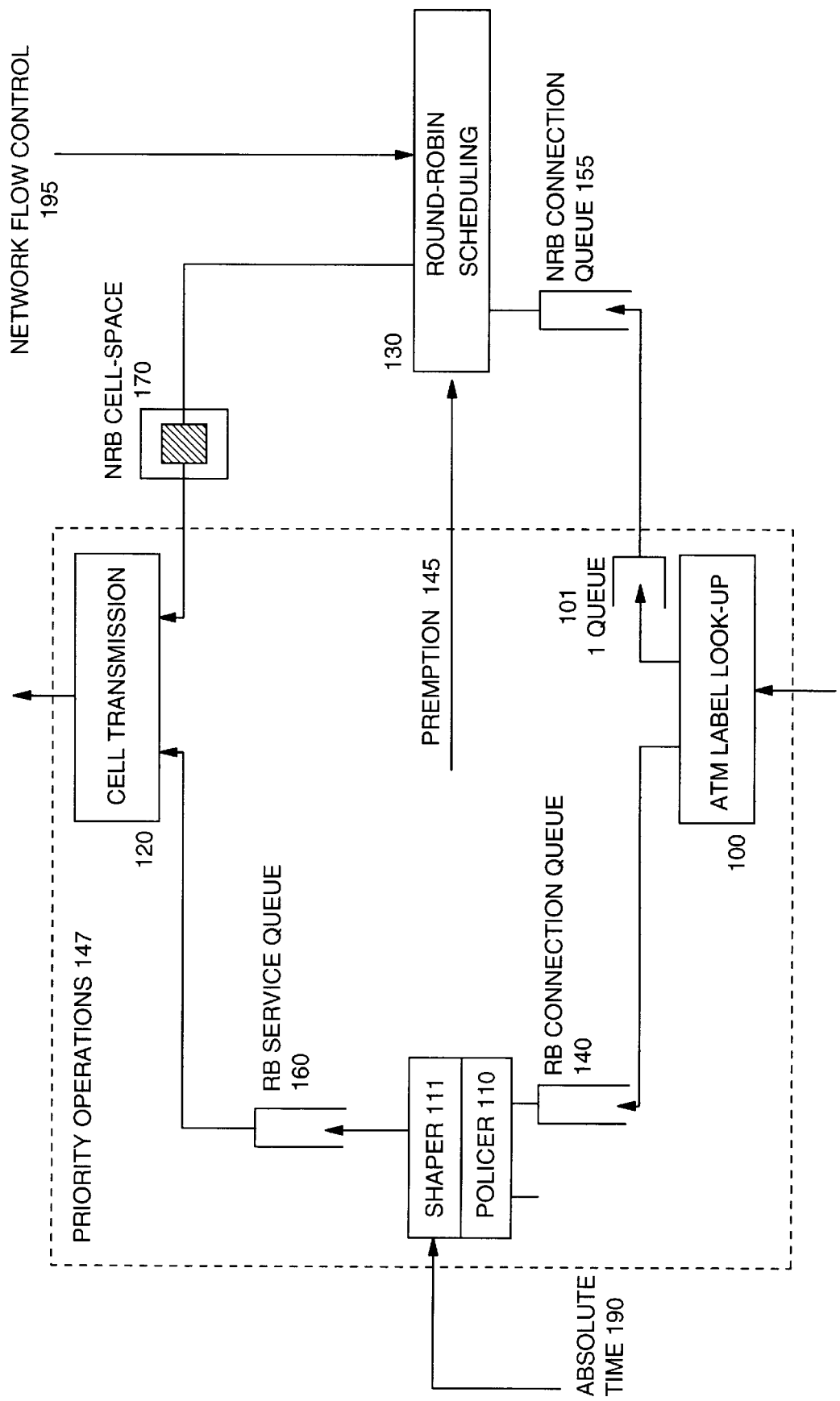
FIG. 1 illustrates a solution for scheduling mixed RB and NRB traffic in a network node.

FIG. 1 illustrates the support of two ATM services, the RB service and the NRB service. These services are supported by independent scheduling schemes, the scheduling of RB service has a priority over the NRB service; the scheduling of the NRB service is activated when the RB service is not active and provide a sharing of the remaining bandwidth between the various NRB connections. Coming back to the implementation of FIG. 1, the ATM label of the incoming cell is first looked-up in order to determine which service the cell belongs to (100). The set of RB connections queues such as 140 and of NRB connections queues such as 155 are managed by independent scheduling schemes. The cells of NRB connections are queued in an intermediate queue (101) allowing a variable process time of the NRB traffic, one example being to make NRB queues 155 readable by the second of the two independent scheduling schemes only if they are not empty. This latter operation improves the efficiency of the second scheduling scheme but increases the enqueuing time when a cell is to be queued in an empty queue 155. In the case where media speed cannot be sustained due to the additional processing, the intermediate queue 101 is added; this implementation is chosen for the preferred embodiment. The enqueueing process in queues 140 for RB traffic and in intermediate queue 101 for NRB traffic is performed at media speed. In the case where there is no intermediate queue 101, the enqueuing in queue 140 and in queue 155 is performed at media speed. The RB scheduling scheme has priority and can interrupt the NRB one at any necessary time. The scheduling scheme for RB service illustrated in FIG. 1 works as follows: the optional policing function (110) checks the incoming cell flow against the traffic contract established at call set-up. Non-compliant cells are discarded if necessary. An optional shaping function (111) reschedules the departure of the cells according to the traffic contract in order to reduce the Cell Delay Variation (CDV), if any, of the incoming cell flow accepted by the policer according to its CDV tolerance setting. While the policing function is triggered by cell arrivals, the shaping function (which is based on a leaky bucket algorithm or a departure calendar) is triggered by the absolute timing inter cells intervals (Tics) 190. When a connection is shaped, the corresponding connection queue (140) is scheduled by the shaper, in the case where it is not empty, the cell at the head of the queue is dequeued from the connection queue 140 and enqueued in the RB service queue 160 for transmission on an output line; when a connection is not shaped, the cells of this connection are directly queued in the RB service queue (160). Queue 160 only serves as a pipeline unit between the shaper and the output line. The cell transmission function (120) empties the RB service queue 160 and sends the cell on the output line. If the RB queue is empty, the cell transmission function transmits a cell of the NRB service if such a cell is ready in the NRB cell space 170. The scheduling scheme for mixed NRB and RB services support is also illustrated in FIG. 1. The scheduler of the NRB service (130) selects a non empty connection queue (the Round Robin scheduler being one example of scheduling) and moves the first cell of the connection queue to the NRB cell space (170) for transmission. As with processing of NRB traffic, the intermediate queue 101 allows a variable processing time for the Minimum Service while sustaining media speed rate in average. The processing of the NRB service may be instantaneously halted by any operation from the priority operations (147) serving the RB traffic (145); optionally, a flow control mechanism such as the one of the prior art, comprises selective backpressure commands (some NRB connections) or a global backpressure command (all NRB connections) applied to the scheduler of the NRB traffic (195). The selective backpressure command selects or deselects one connection queue of the Round Robin scheduler and the global backpressure command stops or restarts the Round Robin scheduler (130).

Using the optional shaping and policing functions of the prioritized scheduling of the RB traffic combined with an efficient call admission control being not part of the invention, the Quality of Service for the RB traffic is characterized by a very low cell loss ratio (under $10^{-20}$) a max Cell Delay Transfer as well as a max Peek to Peek CDV when relevant which are guaranteed for said traffic. The characteristics of the NRB service depend on the type of scheduler (130). A Round Robin scheduling would guarantee a fair sharing, according to the well-known 'Max-min algorithm' criterion, of the remaining bandwidth between all the NRB connections. Fairness is no more respected if the NRB scheduler is a simple FIFO. On top of that, as already mentioned, the cell loss ratio depends on the quality of the flow control mechanism when used: the hop-by-hop flow control of the prior art guarantees a loss-free NRB service.

Figure 2:
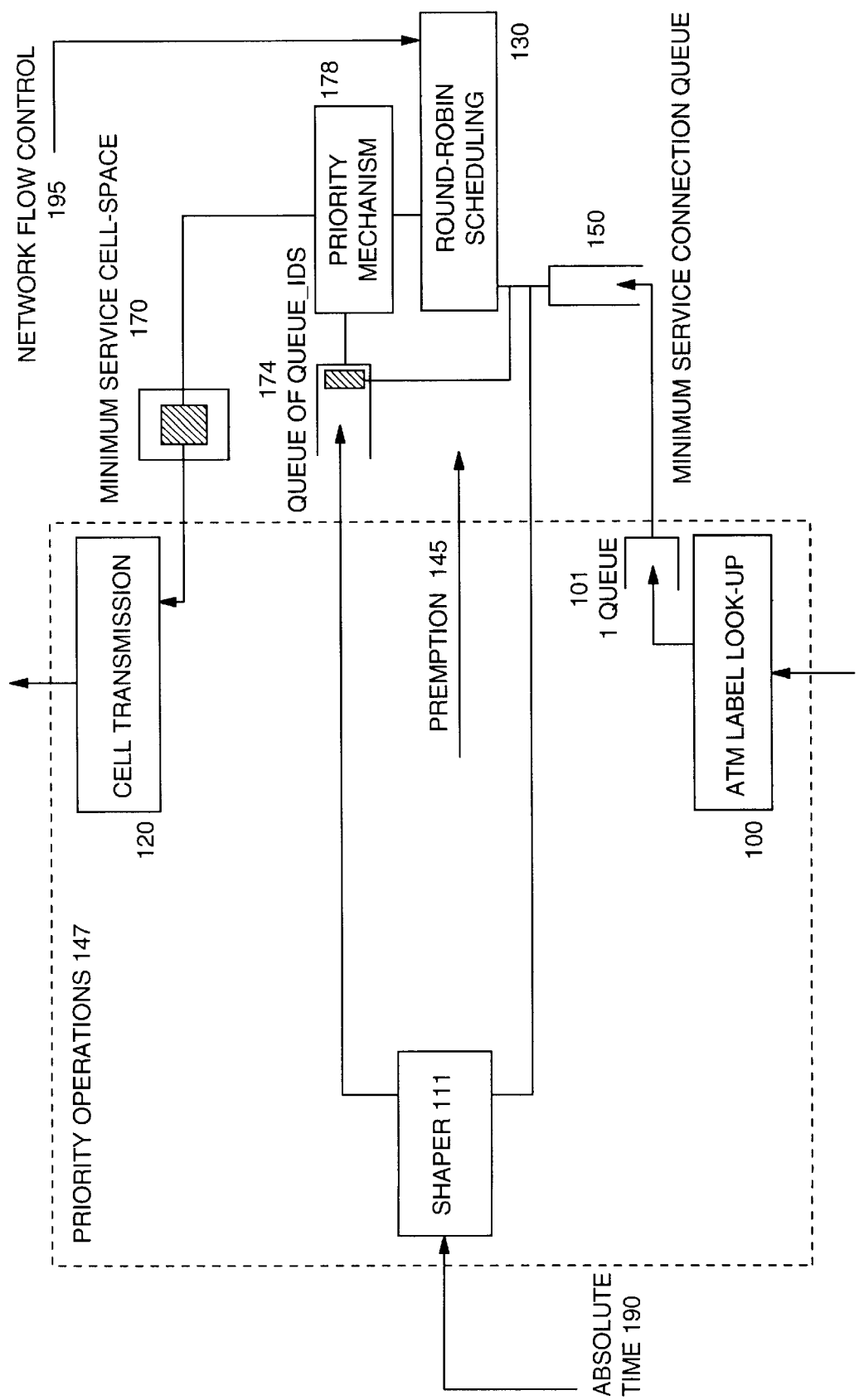
FIG. 2 illustrates the scheduling of the Minimum Service traffic in a network node according to the method of the invention.

Using the two prioritized scheduling mechanisms supporting a mixed traffic generated by RB and NRB connections, the dual scheduling mechanism illustrated in FIG. 2 allows support of the Minimum Service connections in a network node and each node along the connection paths. Once identified by the ATM label look-up mechanism (100), the cells of the Minimum Service connections are queued in the intermediate queue (101), when it is implemented, before being enqueued in a dedicated Minimum Service connection queue (150). According to the dual scheduling mechanism of the invention, the connection queues of the Minimum Service connections are first scheduled by a shaper unit (111) insuring that each connection will get at least its minimum bandwidth; any type of shaper can be used such as a leaky bucket or a calendar. A complementary scheduling scheme shares the remaining available bandwidth between said connections. This remaining bandwidth is the bandwidth not served by the shaper. Cell desequencing of the Minimum Service traffic is avoided by transmitting the minimum bandwidth traffic and the remaining shared bandwidth traffic through the same way, namely the cell space 170. The cell space 170 of the preferred embodiment is a flip-flop or a limited space smoothing the scheduled output traffic. Contention problem for accessing the shared resources (Minimum Service connections queues such as 150 and cell space 170) is solved by adding a queue of queues (174) in which the shaper queues the queue identifiers of the Minimum Service connections that it has scheduled insuring their minimum service traffic in the case their queues (150) are not empty. In the preferred embodiment, while the shaper is under the control of the absolute time (190), the complementary scheduling scheme works each time it can access the resources shared with the shaper (storage units containing connection control blocks). The complementary scheduling may be instantaneously halted (145) by any operation from prioritized operations of area 147 such as the shaper, the ATM cells look up (100), the cell transmission (120) and the enqueueing of the incoming traffic (101, 140). Each time the complementary scheduling is active and as soon as the cell space 170 is not full, a priority mechanism function (178) dequeues from the queue of queues 174 the ready identifier, if the queue of queues is not empty (Minimum traffic to be served); the ready cell is then dequeued from the Minimum Service connection queue 150 corresponding to the identifier and the cell space 170 is filled with the ready cell. If the queue of queues is empty, the Minimum Service connection queue selected by the complementary scheduling is the queue pointed by the Round Robin scheduler (130). The scheduler of the preferred embodiment of the present invention brings a fair sharing of the available bandwidth between the queues 150. However, any scheduler can be used instead of a Round Robin scheduler according to the object of the invention.

Figure 3:
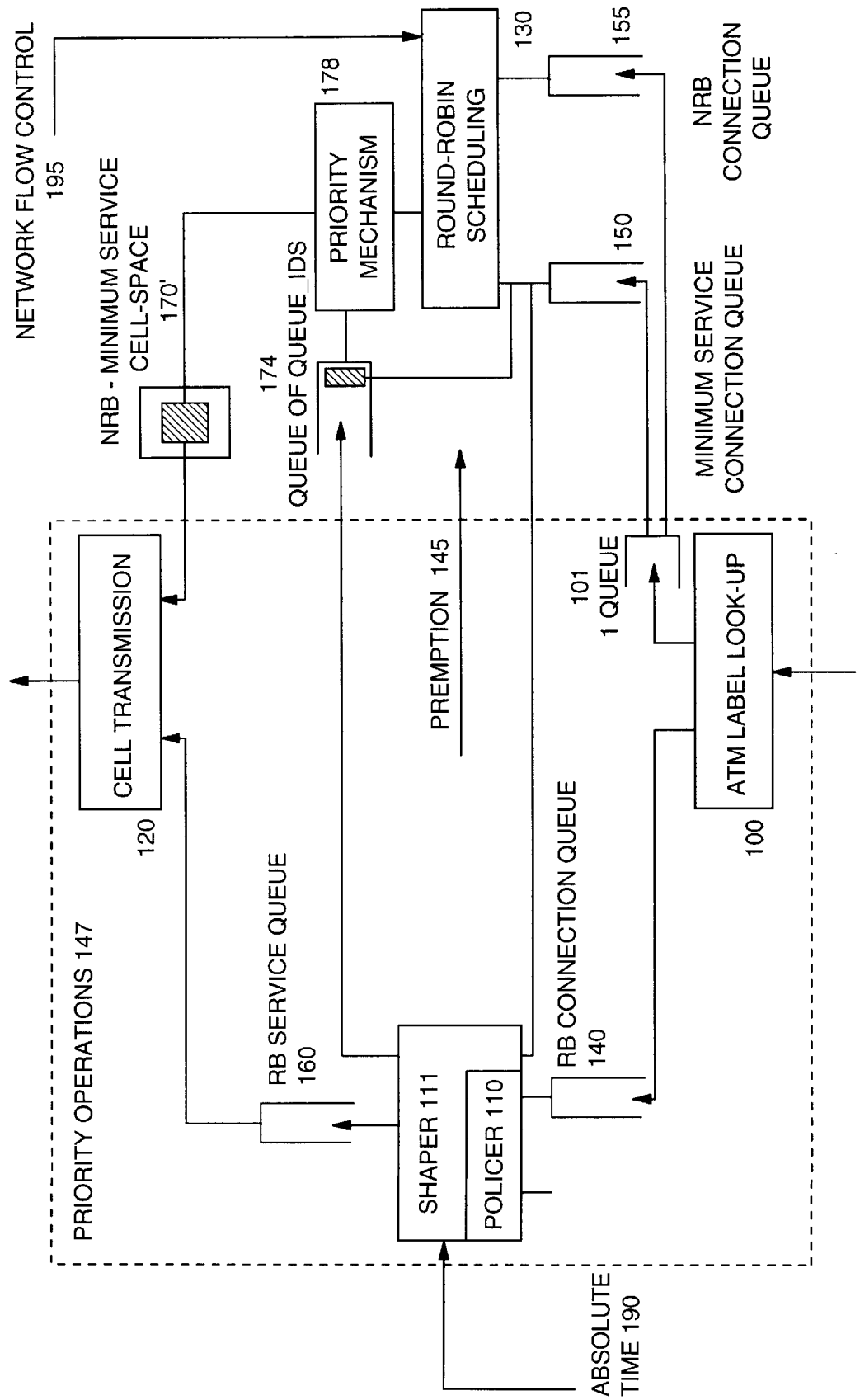
FIG. 3 illustrates the scheduling of mixed RB, NRB and Minimum Service traffic in a network node according to the method of the invention.

FIG. 3 illustrates a mixed environment comprising support for Minimum Service connections as well as RB and NRB ones according to the solution of the present invention. If the cell identified by the ATM label look-up function (100) is a cell of a Minimum Service connection, after buffering in the intermediate queue (101), it is enqueued in a connection queue (150) reachable by a scheduler (130) and a shaper (111). The Minimum Service queues are then scheduled with the same components and as described in FIG. 2. If the cell identified by the ATM label look-up function, depending if the RB connection is shaped or not (the shaper is optional for RB connections), the RB cell is queued in a connection queue 140 or, directly in the RB service queue 160. The RB traffic is scheduled as described in FIG. 1. It is assumed that the total reserved bandwidth of the RB traffic and the total minimum bandwidth of the Minimum Service traffic is controlled by a connection admission control insuring that it remains lower than the out link capacity. If the cell identified by the cell label look-up function (100) is a cell of a NRB connection, after buffering in the intermediate queue (101), it is queued in a connection queue (155) reachable by the scheduler (130) used for the complementary scheduling of the Minimum Service. The queues of the NRB connections (155) are scheduled by the scheduler (130) when active and when the queue of queues (174) for Minimum Service connections is empty (no minimum traffic to be served). The scheduler (130) does not know the type of queues that it handles. Consequently, the queues for Minimum Service, 150 or for NRB, 155 are scheduled with the same priority by the scheduler (130).

In another embodiment, the complementary scheduling scheme of the minimum service connections and the scheduling of NRB connections are performed by two different scheduler themselves controlled by a fixed rule such as alternately processing. An obvious property of this embodiment is to control the available bandwidth sharing according to the type of service. In the example where the two schedulers run alternatively, each service, Minimum Service and NRB service, gets, when necessary, half of the available bandwidth. In this embodiment, when a service requests less bandwidth than it is actually available, the other service can benefit from this bandwidth. In the cited example, if NRB service does not need more than ¼ of the available bandwidth, the minimum service will benefit from ¾ of the available bandwidth.

The scheduler 130 of the complementary scheduling scheme is optionally submitted to a flow control mechanism, the benefit being for the remaining bandwidth sharing of Minimum Service and for NRB service an improved cell loss ratio. As illustrated in FIG. 3, the NRB scheduler 130, when a network traffic flow control is exercised, is submitted to the traffic flow control commands (195). With the traffic control flow cited as the prior art, a global backpressure halts the scheduler (130) which results in scheduling with the shaper only the connections of the Minimum Service: Minimum Service connections get only their minimum bandwidth. Similarly, when a selective 'stop' backpressure is received, the corresponding connection queue (150 for minimum service connection or 155 for NRB service connection) is no more selected by the NRB scheduler 130: a Minimum Service connection selectively stopped gets only its minimum bandwidth. As a summary, when the hop-by-hop traffic control flow mechanism of the prior art is used with the scheduling scheme of the present invention, the Minimum Service is loss free.

Figure 4:
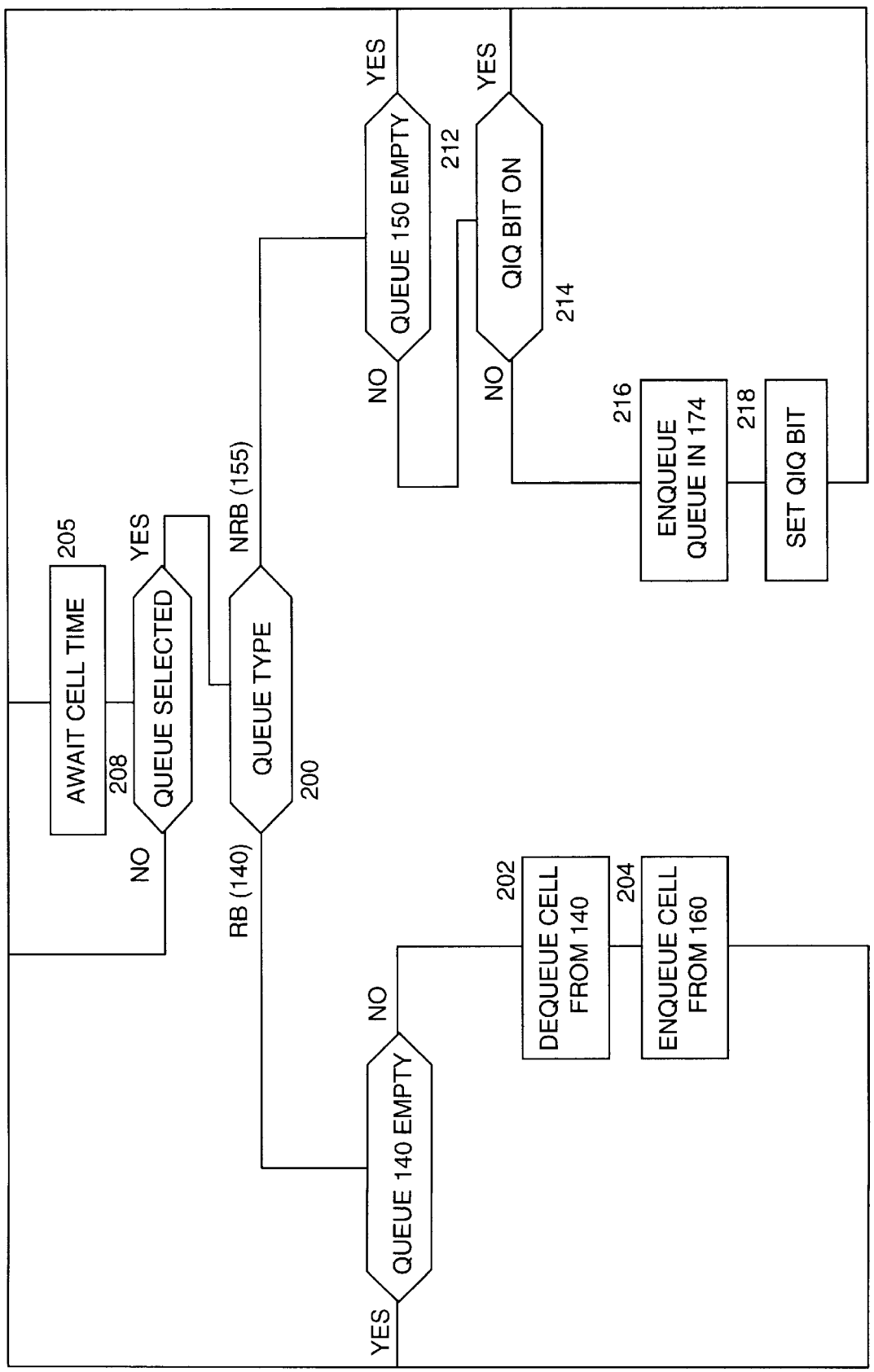
FIG. 4 shows the flow chart describing the basic operations for scheduling the RB and the minimum bandwidth traffic of the Minimum Service traffic according to the present invention.

FIG. 4 describes the operational flow of the shaper operations in the context of the preferred embodiment of the invention in the case where the RB connections are shaped. It shows the scheduling of the RB connections and the minimum bandwidth of the Minimum Service connections. At each cell time (205), when one queue is selected by the shaper (right branch of test 208) and when the queue selected belongs to the RB service (left branch of test 200) the selected queue 140 is tested: if empty, a new cell time is waited for; if queue 140 is not empty, the corresponding cell in the queue 140 is dequeued (202) and enqueued in queue 160 for transmission. The dedicated processing for the minimum scheduling of the Minimum Service starts when the queue selected belongs to the Minimum Service (right branch of test 200); if queue 150 is empty, a new cell time is waited for (right branch of test 212); Minimum Service is served if the queue 150 is not empty (left branch of test 212). The Queue-in-Queue bit (QiQ) read in the Control Block of the connection is then tested (214) for error detection. If the QiQ bit is not set, the identifier of selected queue is then queued in the Queue (174) of Queues (216) and the QIQ bit is set (218). If the QiQ bit is already set in the Control Block of the Minimum Service connection, this means that the corresponding queue is already queued in the queue of queues (174). In this case in the preferred embodiment of the invention the operation has to be aborted since an element cannot be queued twice in a queue. However, this error event which expresses that the Minimum Service is seriously delayed has a very low probability (in the same order that the cell loss ratio of the RB service, that is to say $10^{-20}$); one can replace the queue of queues (174) by an ordered list which would permit to still process a queue in the case it already belongs to the list; however, with such an implementation the same problem would have to be faced when the list is exhausted.

Figure 5:
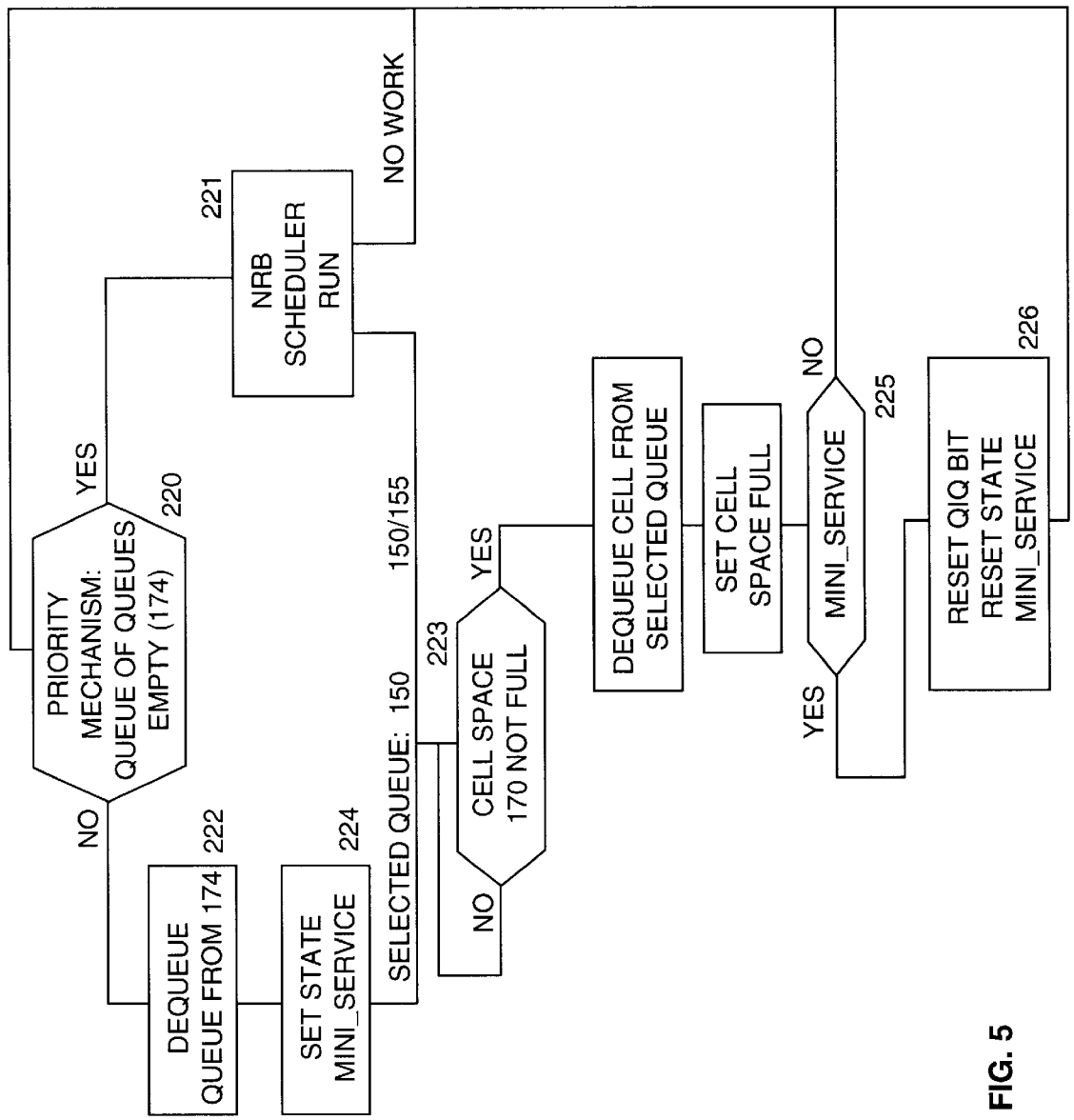
FIG. 5 shows the flow chart describing the basic operations for serving the minimum bandwidth traffic of the Minimum Service connections, the NRB traffic and the remaining bandwidth traffic of the Minimum Service connections according to the present invention.

FIG. 5 describes the operational flow of the complementary scheduling operations in the context of the preferred embodiment of the invention. It shows the operational flow of the scheduling of NRB service and the Minimum Service. When the queue 174 is not empty (left branch of test 220), the corresponding Minimum Service connection queue (150) is dequeued (222) from the queue of queues (174) and the state 'Minimum Service' is set (224). If the test 220 result is Yes, the queue of queue (174) is empty and there is no waiting Minimum Service connection to be served according to its minimum guaranteed bandwidth. This means that the scheduler 130 (Round-Robin for the preferred embodiment) will select (221) one connection queue among the Minimum Service connections queues (150) or the NRB connection queues (155) which have the same priority for the scheduler. If the queues 150 and 155 are empty, the scheduler has no work to do ('No Work' branch) and the priority mechanism is reactivated (go to step 220). Else, in step 223 the cell space 170 is tested; if not full, the selected queue is dequeued, stored in the cell space (170) and the cell space is set full if appropriate. If the 'Minimum Service state' is set (test 225), the indicators of Minimum Service are reset (226), that is to say QiQ bit of the selected Minimum Service queue and 'Minimum Service state'.

Figure 8:
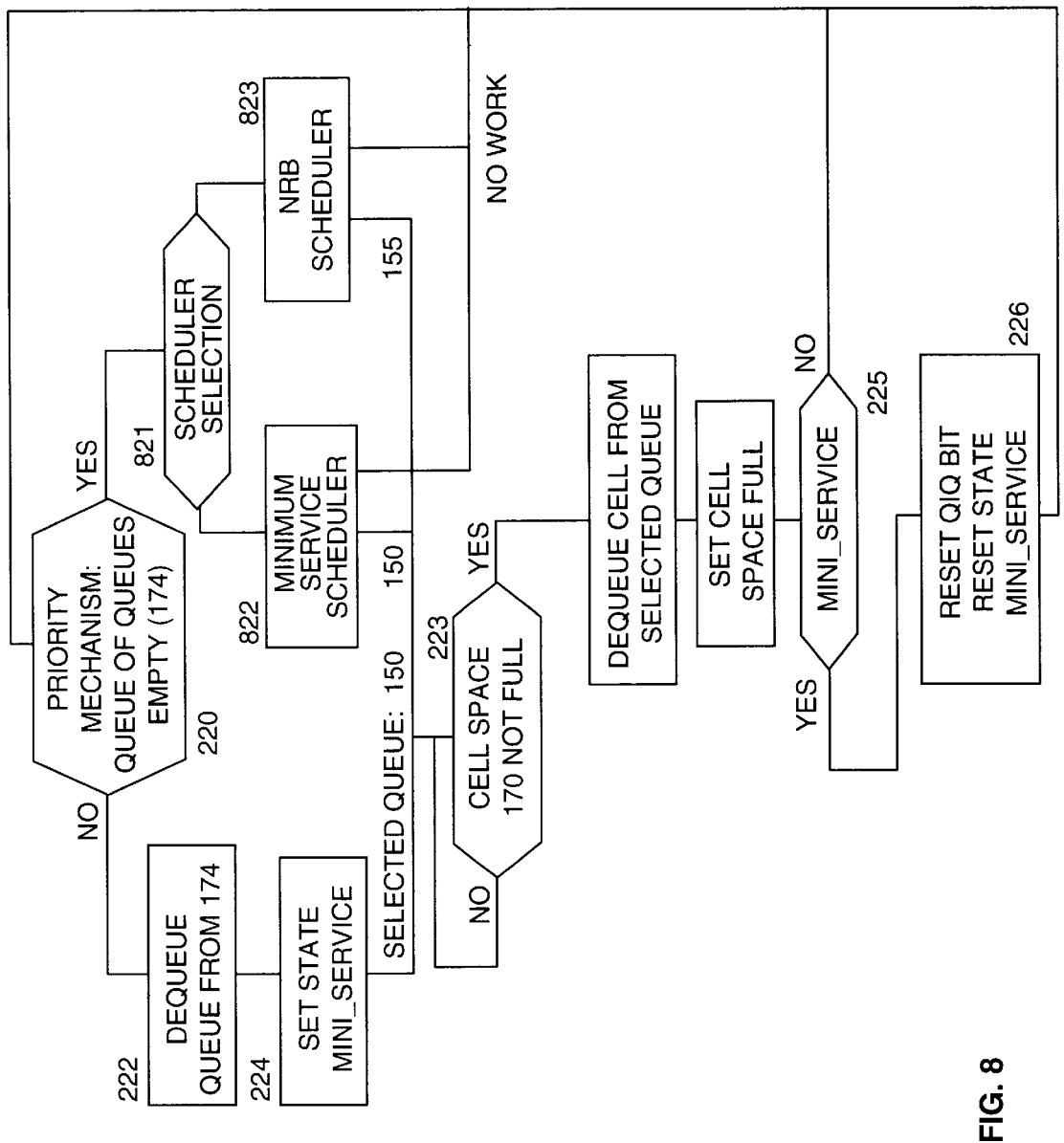
FIG. 8 shows the flow chart describing the basic operations for serving minimum service and NRB service connections with the use of two scheduling schemes as for the complementary scheduling.

FIG. 8, similarly to FIG. 5 describes the NRB cell process serving the Minimum Service and the NRB service. On the contrary of FIG. 5, there are two scheduling schemes for insuring sharing of available bandwidth between the Minimum Service and the NRB connections according to the preferred embodiment suggested in the description of FIG. 3. The algorithm supporting this embodiment differs from the one described in FIG. 5 at step 221 which is the activation of NRB scheduler 130. The step 821 replaces the step 221 of activation of NRB scheduler; in step 821 one of the two schedulers is selected according to a controlling rule, for instance, each scheduler is run alternatively. Depending on the selected scheduler, the Minimum Service scheduler, serving the Minimum Service connections is activated (step 822) or the NRB scheduler serving the NRB connections is activated (step 823). Once activated, the selected scheduler has either some work to do (queues 150 or 155 not empty) and the next step 223 is performed, or the selected scheduler has no work to do (queue empty) and step 220 is performed activating the priority mechanism.

Figure 6:
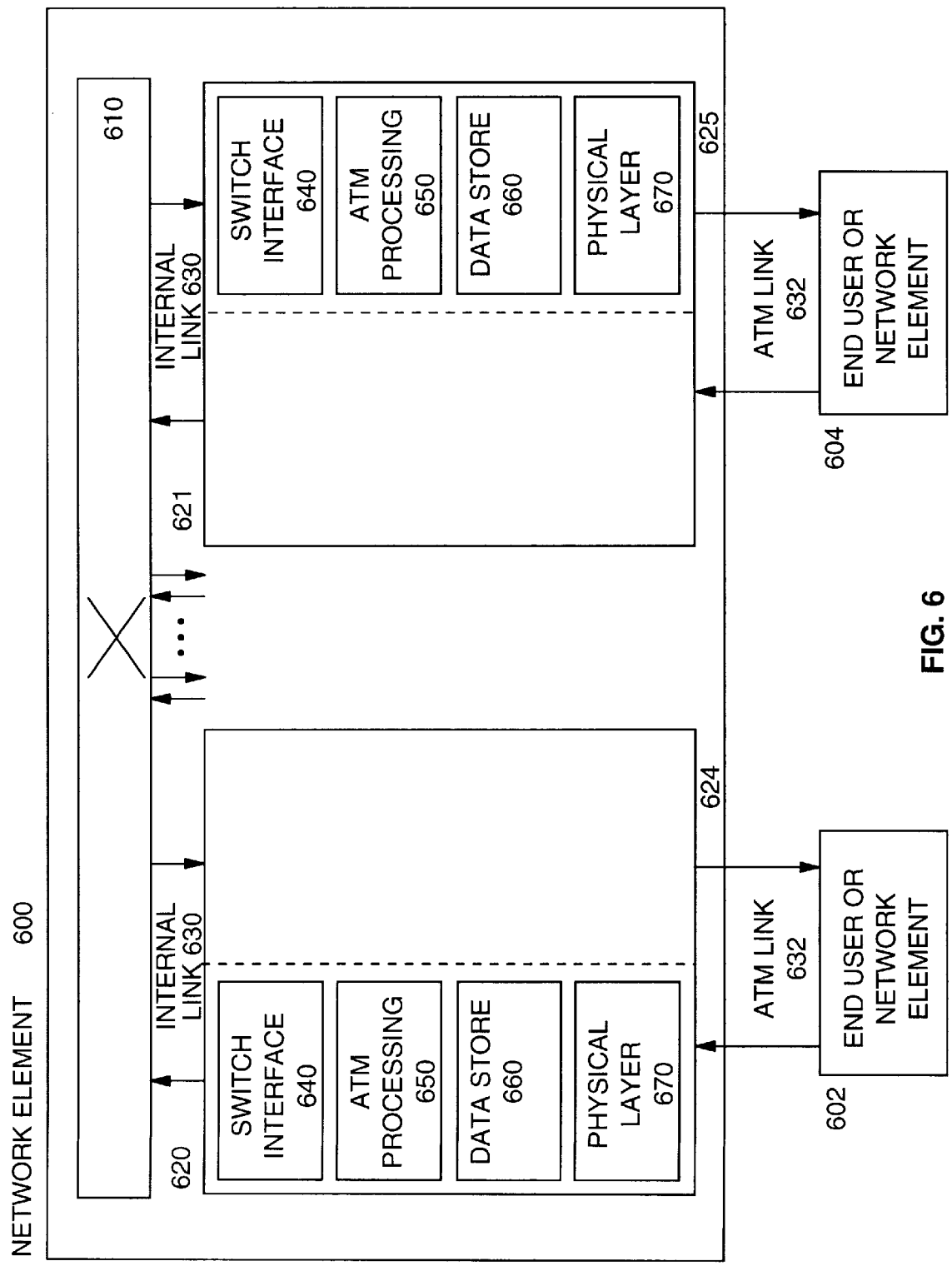
FIG. 6 illustrates one implementation of the method of the invention in a network node.

FIG. 6 illustrates the use of the input and the output traffic scheduling according to the present invention in the adapter cards of an ATM network element 600; this network element switches between an end user 602 and an end user 604 ATM traffic such as RB, NRB or Minimum Service. The traffic enters the network element 600 via an ATM link 632 into the Transmit adapter card 620. The Transmit adapter card processes first the ATM physical layer in the component 670 and the data is then queued in the DATA STORE component 660. The apparatus implementing the method of the invention so called 'ATM processing' (650) schedules the cells for transmission to the switch 610 according to the present invention through the switch interface 640. The cells reach the switch 610 via internal links 630. Once the network switching process is performed in the switch the cells are sent for transmission out of the switch to a Receive adapter (621) through internal links 630. The cells are conveyed to the scheduling apparatus of the present invention (650) of the Receive adapter through a switch interface 640 and a data store 660. After being scheduled according to the present invention, the cells go through the ATM physical layer processed in the component 670. The cells are then sent to the destination 604 on output ATM links 632 from the network element 600.

Figure 7:
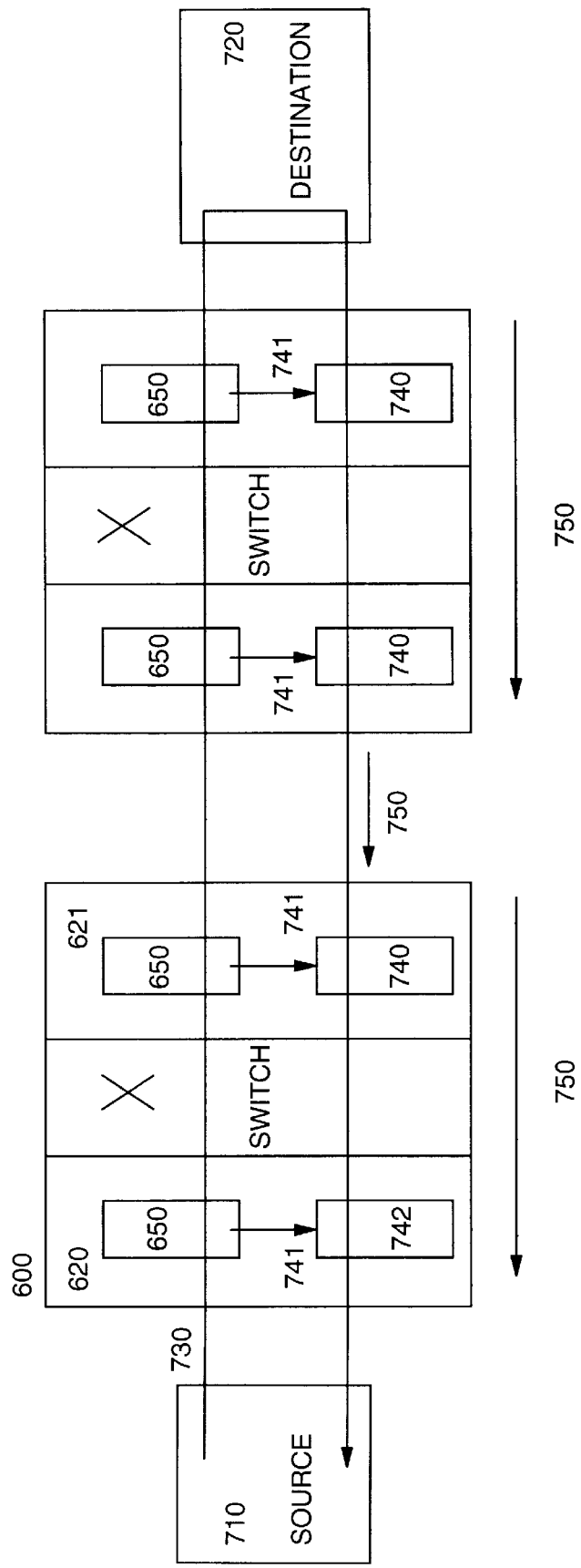
FIG. 7 illustrates the support of the minimum service according to the present invention used for the ABR service with optional network flow control.

FIG. 7 illustrates one implementation in a network element of the scheduling scheme of the present invention for the support of ABR connections. To support the ABR service, the scheduling scheme will be combined with a per-connection measurement mechanism providing feedback information to the source either using the EFCI (Explicit Forward Congestion Information) cell marking or the Relative Rate marking as defined by the ATM Forum specification. This combination is implemented in the Receive and the Transmit adapters of all the network elements of the ABR connection paths. In FIG. 7, the source (710) sends data cells and control cells (Resource Management, RM, cells) to the destination (720). The traffic crosses in FIG. 7 two network elements (600). Implementing the scheduling scheme of the present invention in the ATM processing (650) layer of their Transmit and Receive adapters (620, 621). The destination (720) turns around the RM cells back to the source (710), closing the ABR control loop (730). The congestion measurement of each adapter (741) using the queue status of the ATM processing (650) triggers the RM cells marking processes (740, 742) of the backward control cell flow. The marking process 740 uses the congestion indication bit (CI) and the No Increase (NI) bit field of the RM control cell; the process 742 of the network element located in the network element at the ingress of the network, the nearest to the source, does not use the CI bit; it indicates in the RM control cells an explicit rate equal to the minimum cell rate to indicate directly to the source that its traffic needs to be reduced.

Optionally, a hop-by-hop backpressure mechanism (as described in the prior art) can be added in each node of the ABR path; backpressure commands (750) are sent backward from one ATM processing scheme (650) to the upstream one and are triggered by the same per-connection measurement mechanism triggering also the ABR feedback process for the source. The consequence of the backpressure is that the upstream backpressured ATM processing unit (650) will reduce the transmission rate of the backpressured connections to their MCR, at the maximum, this bandwidth representing the rate guaranteed by ATM processing unit 650. This will avoid immediately congestion increase. Combined with the ingress network RM cell marking process (742) which provides the backpressure command on the last hop back to the source, the backpressure mechanism results in a loss free ABR service.

We claim:

1. In a packet network node, a method for receiving and transmitting the packets of minimum service connections for which a minimum of bandwidth is reserved at connection establishment, the method comprising the steps of:

receiving packets of said minimum service connections into dedicated minimum service connection queues;

scheduling for transmission, under control of a first scheduler operating on fixed time intervals, the minimum service connection queues according to a rate which corresponds to the value of the minimum reserved bandwidth of the minimum reserved bandwidth connections;

storing identifiers for each minimum service connection queue scheduled by said first scheduler into an identifier queue;

scheduling for transmission, under control of a second scheduler, the minimum service connection queues not scheduled by said first scheduler;

reading the identifiers from said identifier queue;

transmitting the first packet of the minimum service connection queue corresponding to each identifier read; and transmitting the first packet of each minimum service connection queue scheduled by said second scheduler when said identifier queue is empty.

2. The method of claim 1 further supporting the receiving and transmission of packets of non-reserved bandwidth connections for which no bandwidth is reserved at connection establishment; the method further comprising the steps of:

receiving packets of said non-reserved bandwidth connections into dedicated non-reserved bandwidth connection queues;

scheduling for transmission, under control of said second scheduler, the non-reserved bandwidth connection queues.

3. The method of claim 1 further supporting the receiving and transmission of packets of reserved bandwidth connections for which a fixed bandwidth has been reserved at connection establishment, the method further comprising the steps of:

receiving packets of said reserved bandwidth connections into dedicated reserved bandwidth connection queues; and transmitting the first packet of said reserved bandwidth connection queues, wherein the transmission of packets from said minimum service connection queues is disabled until said reserved bandwidth connection queues are emptied.

4. The method of claim 3 further comprising the step of:

scheduling for transmission, under control of said first scheduler, the reserved bandwidth connection queues according to a rate which corresponds to the value of the reserved bandwidth of the reserved bandwidth connections.

5. The method of claim 3 further supporting the receiving and transmission of packets of non-reserved bandwidth connections for which no bandwidth is reserved at connection establishment; the method further comprising the steps of:

receiving packets of said non-reserved bandwidth connections into dedicated non-reserved bandwidth connection queues;

scheduling for transmission, under control of said second scheduler, the non-reserved bandwidth connection queues.

6. The method of claim 1, wherein said packet network node is located on a path supporting minimum service connections between a source and a destination end-system, said path forming a control loop carrying control packets sent from said source end-system to said destination end-system and returned to said source end-system, the method further comprising the steps of:

measuring the queuing levels of said minimum service connections by determining the number of packets stored in each of said minimum service connection queues; and setting status bits in said control packets returning from said destination end-system to said source end-system when said queuing levels exceed predefined queuing level thresholds.

7. The method of claim 6, wherein said packet network node is located on said path adjacent to said source end-system, the method further comprising the step of:

storing the minimum bandwidth reserved at connection establishment into a dedicated field of said control packets returning from said destination end-system to said source end-system when said queuing levels exceed predefined queuing level thresholds.

8. The method of either claim 1 or 4, wherein said first scheduler operates as a shaping function based on a leaky bucket algorithm.

9. The method of either claim 1 or 4, wherein said first scheduler operates as a shaping function based on a departure calendar.

10. The method of any one of claims 1, 2 and 5, wherein said second scheduler operates as a round-robin scheduler.

11. The method of any one of claims 1, 2 and 5, wherein said second scheduler is controlled by commands of a network traffic flow control.

12. The method of any one of claims 1, 2, 3 and 5, wherein the packet network is an ATM network and the packets are ATM cells.

13. An apparatus for receiving and transmitting, in an Asynchronous Transfer Mode (ATM) network node, the traffic cells of minimum service connections, for which a minimum of bandwidth is reserved at connection establishment, of reserved bandwidth connections, for which a fixed bandwidth is reserved at connection establishment and of non-reserved bandwidth connections, for which no bandwidth is reserved at connection establishment, the apparatus comprising:

a receiver for storing the incoming cells of minimum service connections, reserved bandwidth connections and non-reserved bandwidth connections into dedicated service-type connection queues;

a first scheduler, operating on fixed time intervals, for scheduling the transmission of minimum service connection queues and reserved bandwidth connection queues according to a rate which corresponds to the value of the minimum reserved bandwidth of the minimum reserved bandwidth connections and the value of the reserved bandwidth of the reserved bandwidth connections;

an identifier queue for storing the identifiers for each minimum service connection queue scheduled by said first scheduler;

a second scheduler for scheduling the transmission of non-reserved bandwidth connection queues and minimum service connection queues not scheduled by said first scheduler; and a transmitter for transmitting the first cell of said scheduled queues from:

said reserved bandwidth connections whenever said reserved bandwidth connection queues are not empty, said minimum service connections corresponding to each identifier stored in said identifier queue, or said non-reserved bandwidth connections when both said reserved bandwidth connection queues and said identifier queue are empty.

14. A network adapter for transmitting and receiving ATM cells carried over an ATM network, said network including source and destination end-systems, switches, and network links supporting minimum service connections, reserved bandwidth connections and non-reserved bandwidth connections, wherein a minimum bandwidth has been reserved at connection establishment, the adapter comprising:

a physical layer interface for processing said ATM cells transmitted to and received from said source and destination end-systems, the physical layer interface coupled to;

a data store for queuing said ATM cells in the network adapter, the data store coupled to;

an ATM cell processor for scheduling the transmission of said ATM cells between said source and destination end-systems and said switches, the ATM cell processor having:

a receiver for storing the incoming cells of minimum service connections, reserved bandwidth connections and non-reserved bandwidth connections into dedicated service-type connection queues;

a first scheduler, operating on fixed time intervals, for scheduling the transmission of minimum service connection queues and reserved bandwidth connection queues according to a rate which corresponds to the value of the minimum reserved bandwidth of the minimum reserved bandwidth connections and the value of the reserved bandwidth of the reserved bandwidth connections;

an identifier queue for storing the identifiers for each minimum service connection queue scheduled by said first scheduler;

a second scheduler for scheduling the transmission of non-reserved bandwidth connection queues and minimum service connection queues not scheduled by said first scheduler;

a transmitter for transmitting the first cell of said scheduled queues from:

said reserved bandwidth connections whenever said reserved bandwidth connection queues are not empty, said minimum service connections corresponding to each identifier stored in said identifier queue, or said non-reserved bandwidth connections when both said reserved bandwidth connection queues and said identifier queue are empty; and a switch interface for processing said ATM cells transmitted to and received from said switches, the switch interface coupled to said switches and said ATM cell processor.

* * * * *